(12) United States Patent
Hayashi et al.

(10) Patent No.: US 7,706,005 B2
(45) Date of Patent: Apr. 27, 2010

(54) IMAGE COMMUNICATION APPARATUS FOR SENDING FACSIMILE DATA TO A FACSIMILE MACHINE IN RESPONSE TO A FACSIMILE-FORWARDING INSTRUCTION

(75) Inventors: Manabu Hayashi, Iwatsuki (JP); Kazutaka Saitoh, Iwatsuki (JP); Takashi Sakayama, Ebina (JP); Hitoshi Tamura, Iwatsuki (JP); Yoshihiro Maei, Iwatsuki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1286 days.

(21) Appl. No.: 10/658,778

(22) Filed: Sep. 10, 2003

(65) Prior Publication Data

US 2004/0184075 A1 Sep. 23, 2004

(30) Foreign Application Priority Data

Mar. 20, 2003 (JP) .............................. 2003-078262

(51) Int. Cl.
*G06F 15/00* (2006.01)
*G06F 3/12* (2006.01)
*G06K 1/00* (2006.01)
*H04N 1/00* (2006.01)

(52) U.S. Cl. ..................................... 358/1.15; 358/401
(58) Field of Classification Search ............ 358/426.06, 358/426.08, 426.05, 403, 1.15, 1.1
See application file for complete search history.

(56) References Cited

U.S. PATENT DOCUMENTS

| | | | | |
|---|---|---|---|---|
| 5,442,457 A | * | 8/1995 | Najafi | ........................ 358/400 |
| 5,859,967 A | * | 1/1999 | Kaufeld et al. | ................. 726/5 |
| 6,211,972 B1 | * | 4/2001 | Okutomi et al. | ............. 358/402 |
| 6,373,598 B1 | * | 4/2002 | Matsumoto et al. | ......... 358/442 |
| 6,771,382 B1 | * | 8/2004 | Misawa et al. | ............. 358/1.15 |
| 6,956,833 B1 | * | 10/2005 | Yukie et al. | .................. 370/328 |
| 6,982,803 B2 | * | 1/2006 | Eguchi | ........................ 358/1.15 |
| 7,009,725 B2 | * | 3/2006 | Miyanaga | ................... 358/1.15 |
| 2002/0054335 A1 | * | 5/2002 | Sekiguchi | ................... 358/1.15 |
| 2002/0059389 A1 | * | 5/2002 | Toyoda et al. | ................ 709/206 |
| 2003/0030848 A1 | * | 2/2003 | Inoue | .......................... 358/402 |
| 2004/0128207 A1 | * | 7/2004 | Ray | ............................. 705/26 |

FOREIGN PATENT DOCUMENTS

| | | |
|---|---|---|
| JP | A-11-98291 | 4/1999 |
| JP | A 11-239263 | 8/1999 |
| JP | A-11-355483 | 12/1999 |
| JP | A-2000-196660 | 7/2000 |
| JP | A-2002-57833 | 2/2002 |
| JP | A-2002-190898 | 7/2002 |

* cited by examiner

*Primary Examiner*—Douglas Q Tran
(74) *Attorney, Agent, or Firm*—Oliff & Berridge, PLC

(57) ABSTRACT

An image communication apparatus comprises an email receiving unit for receiving an email; facsimile-forwarding unit for facsimile-forwarding the email received by the email receiving unit; a forwarding-size-upper-limit setting unit for setting a predetermined forwarding size upper limit; and a facsimile-forward limiting unit for limiting the facsimile-forwarding when the forwarding size to be facsimile-forwarded by the facsimile-forwarding unit exceeds the forwarding size upper limit set by the forwarding-upper-limit-size setting unit.

8 Claims, 7 Drawing Sheets

*11*

| DESTINATION ADDRESS | FORWARDING DESTINATION |
|---|---|
| X@xxxxxx.co.jp | 03-XXX-XXXX |
| Y@xxxxxx.co.jp | 03-YYY-YYYY |

| DESTINATION NAME | EMAIL ADDRESS | TELEPHONE NUMBER |
|---|---|---|
| A | A@AAAA.co.jp | 03-AAA-AAAA |
| B | B@BBBB.co.jp | 03-BBB-BBBB |

FIG.4B

IMAGE COMMUNICATION APPARATUS FOR SENDING FACSIMILE DATA TO A FACSIMILE MACHINE IN RESPONSE TO A FACSIMILE-FORWARDING INSTRUCTION

BACKGROUND OF THE INVENTION

1. Field of the Invention

The present invention relates to an image communication apparatus which forwards contents of a received electronic mail (referred to as "email" hereafter) through facsimile by converting email data into facsimile data (referred to as "fax-forward" hereafter), and especially relates to an image communication apparatus which controls fax-forwarding of a received email based on a fax-forwarding instruction made by an email data in the received email, or based on a forwarding list and an address book managed by a system data of the image communication apparatus, and further, based on a forwarding size upper limit or the like.

2. Related Art

Conventionally, there has been a facsimile machine which fax-forwards contents of a received email to a destination indicated in the email by a sender of the email.

This technology saves cost of sending a facsimile to a remote party, and enables an apparatus which does not have a facsimile capability to send a facsimile by using an email to instruct fax-forwarding.

In this facsimile machine, however, the party which fax-forwards pays for the forwarding cost. Therefore, it is necessary to take preventive measures not to be misused by a third party.

In view of the foregoing, as disclosed in Japanese Patent Application Publication No. 11-239263, such technology is devised in which a destination and a password are set in an email, and fax-forwarding is conducted only when it is determined that the password is valid.

A facsimile machine is also devised in which contents of a received email are fax-forwarded to a destination indicated in advance by a receiving party.

This technology enables a receiving party to know the contents of an email by the fax-forwarding even when the receiving party stays at a location where email is not available.

Further, such technology is devised in which a fact that forwarding is failed is reported to a sender of an email when fax-forwarding fails. With this technology, a sender of an email can know that fax-forwarding of a sent email failed.

In the conventional technology described above, however, a communication line is occupied for a long period of time by fax-forwarding when a fax-forward instruction for large-sized image information is received, and therefore there may occur a problem that another facsimile sending cannot be preformed during this period.

Also, such a problem may occur that the communication cost increases when a large number of error emails arrive.

Additionally, although the technology disclosed in the above-mentioned Japanese Patent Application Publication No. 11-239263 is effective for this problem when the sender instructs the fax-forwarding, this problem cannot be solved when the forwarding party who has received an email instructs the forwarding.

Further, it is of no use to report a forwarding failure to an email sender, and it may cause a confusion of the email sender when the forwarding party instructs forwarding.

SUMMARY OF THE INVENTION

The present invention has been made in view of the above circumstances and a first aspect of the present invention provides an image communication apparatus comprising an email receiving unit for receiving an email; a facsimile-forwarding unit for facsimile-forwarding the email received by the email receiving unit; a forwarding-size-upper-limit setting unit for setting a predetermined forwarding size upper limit; and a facsimile-forward limiting unit for limiting the facsimile-forwarding when the forwarding size to be facsimile-forwarded by the facsimile-forwarding unit exceeds the forwarding size upper limit set by the forwarding-upper-limit-size setting unit.

A second aspect of the present invention provides an image communication apparatus comprising an email receiving unit for receiving an email; a facsimile-forwarding unit for facsimile-forwarding the email received by the email receiving unit; a registering unit for registering email addresses of predetermined senders of the email; and a facsimile-forward limiting unit for limiting the facsimile-forwarding when email address of a sender of the email to be facsimile-forwarded by the facsimile-forwarding unit is not registered in the registering unit.

A third aspect of the present invention provides an image communication apparatus comprising an email receiving unit for receiving an email; a facsimile-forwarding unit for facsimile-forwarding the email received by the receiving unit; a determining unit for determining whether the facsimile-forwarding by the facsimile-forwarding unit is instructed by the email or by setting of the image communication apparatus; and a control unit for discarding the email if the determining unit determines that the facsimile-forwarding is instructed by the email, and saving the email if the determining unit determines that the facsimile-forwarding is instructed by setting of the image communication apparatus, when the facsimile-forwarding by the facsimile-forwarding unit fails.

A fourth aspect of the present invention provides an image communication apparatus comprising an email receiving unit for receiving an email; a facsimile-forwarding unit for facsimile-forwarding the email received by the receiving unit; a determining unit for determining whether the facsimile-forwarding by the facsimile-forwarding unit is instructed by the email or not; and facsimile-forwarding control unit for conducting the facsimile-forwarding based on an instruction of the facsimile-forwarding instructed by the email while ignoring an instruction of the facsimile-forwarding set within the image communication apparatus, when the determining unit determines that the facsimile-forwarding is instructed by the email, and the instruction of the facsimile-forwarding is set within the image communication apparatus.

A fifth aspect of the present invention provides an image communication apparatus including facsimile sending unit comprising a sending-size-upper-limit setting unit for setting a sending size upper limit; and facsimile sending limiting unit for limiting facsimile sending when the size to be sent by the facsimile sending unit exceeds the sending size upper limit set by sending-size-upper-limit setting unit.

With the present invention, it is possible to reduce a load caused by fax-forwarding large-sized facsimile data.

Additionally, it is possible to prevent fax-forwarding resulting from an error email or unnecessary email, and to properly report a forwarding result (report) to a sender of an email or a destination.

Consequently, effects of reducing useless communication cost in the fax-forwarding, reducing and distributing the operation load of the fax-forwarding, and eliminating confusion of a party instructing the fax-forwarding are provided.

BRIEF DESCRIPTION OF THE DRAWINGS

Embodiment of the present invention will be described in detail based on the following drawings, wherein:

FIGS. 4A and 4B illustrate respectively examples of items and contents of a forwarding list and an address book stored and managed in an auxiliary memory apparatus;

DESCRIPTION OF THE EMBODIMENTS

Embodiment of the present invention is described below in detail while referring to accompanying drawings.

Figure 1:
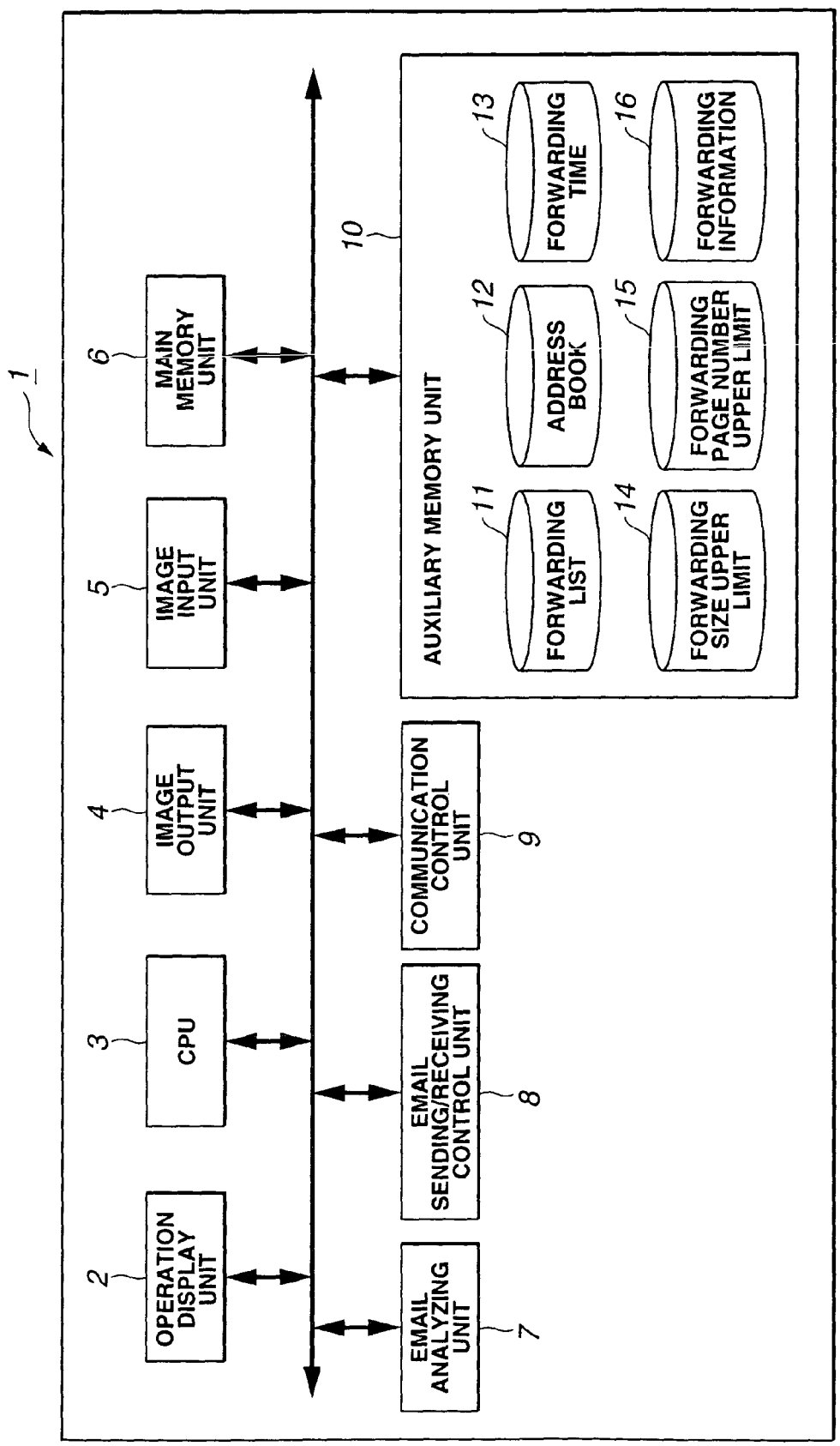
FIG. 1 illustrates a configuration of control in an embodiment of an image communication apparatus according to the present invention.

FIG. 1 is a diagram illustrating a control configuration of an embodiment of an image communication apparatus according to the present invention.

Referring to FIG. 1, the image communication apparatus 1 comprises an operation display unit 2, a CPU 3, an image output unit 4, an image input unit 5, a main memory unit 6, an email analyzing unit 7, an email sending/receiving control unit 8, a communication control unit 9, and an auxiliary memory unit 10.

An email received by the email sending/receiving control unit 8 is analyzed by an email analyzing unit 7, and an email subject to forwarding is converted into facsimile data by the communication control unit 9, and then, is fax-forwarded.

The operation display unit 2 is an input/output apparatus for an operator to conduct different types of operations for a facsimile function and a fax-forwarding function for a received email, as well as maintenance operations such as checking and changing system data in the image communication apparatus 1.

The CPU 3 executes a control program stored in the main memory unit to conduct individual control of the image communication apparatus.

The image output unit 4 prints a facsimile document, a forwarding result (report), and a received email document.

The image input unit 5 reads a document such as a facsimile document as image data.

The main memory unit 6 stores the control program required for controlling individual functions of the image communication apparatus 1, and data temporarily required for the control processing.

The email analyzing unit 7 analyzes and obtains the sender's address of a received email, the presence/absence of a forwarding specification, and a destination address of the forwarding destination.

The email sending/receiving control unit 8 sends/receives an email through the communication control unit based on an email sending/receiving protocol.

The communication control unit 9 controls communication with a telephone network (not shown) and the Internet (not shown).

Further, the communication control unit 9 controls sending/receiving of a facsimile. Especially in the fax-forwarding, the communication control unit 9 conducts time-specified forwarding which sends a facsimile at a specified time, and split forwarding which splits facsimile data into units each having a data size equal to or lower than forwarding upper limits, and then sends each of the units separately, in addition to instant transmission.

The auxiliary memory unit 10 stores and manages a forwarding list 11, an address book 12, a forwarding size upper limit 14, a forwarding page number upper limit 15, a forwarding time 13, and forwarding information 16 as system data required for the fax-forwarding.

The forwarding list 11 and the address book 12 contain information for determining whether a received email is subject to the forwarding.

The forwarding size upper limit 14 and the forwarding page number upper limit 15 are reference values for determining whether to stop forwarding, to conduct split forwarding, or to conduct time-specified forwarding for facsimile data with a large data size, and simultaneously, are values for determining a size of the split unit for the split forwarding.

The forwarding time 13 is a start time of a facsimile-forwarding when the forwarding time 13 is specified in the fax-forwarding control, and especially, is information indicating a specified time within a time zone where the communication line is not congested, and further, within a time zone where the communication cost is set to low.

The forwarding information 16 is for a received email which the email analyzing unit 7 determined as an email subject to the fax-forwarding, and includes information for managing forwarding destination information, information for indicating a document to be forwarded, and the forwarding time 13 for the fax-forwarding in which forwarding is specified.

Now, the operations of the fax-forwarding for an email in the image communication apparatus 1 is described for the first through fourth forwarding control processing.

First, the first forwarding control processing is described.

In the first forwarding control processing in the image communication apparatus 1, when the fax-forwarding is conducted according to an instruction in a received email, the size of an image to be forwarded is checked based on the forwarding size upper limit 14 stored in the auxiliary memory unit 10, and if the size exceeds the forwarding size upper limit 14, the received email is printed and a report on disabled forwarding is ejected from the image output unit 4

The email analyzing unit 7 analyzes data of a received email when the email sending/receiving control unit 8 receives the email, determines the presence/absence of a forwarding instruction, and reads out a forwarding destination, the address of a sender, and the like when the forwarding instruction is present.

In this process, the absence/presence of the fax-forwarding instruction in the received email is determined based on destination information in a header of the email data, based on predetermined data set in the email main body, based on a file name, data, or the like of an attachment file, or by linking to a specific email folder to which the received email is sorted.

Further, when the forwarding instruction is set in the received email, the email analyzing unit 7 converts the email data into the facsimile data, and instructs the communication control unit 9 to fax-forward the facsimile data to the forwarding destination.

Figure 2:
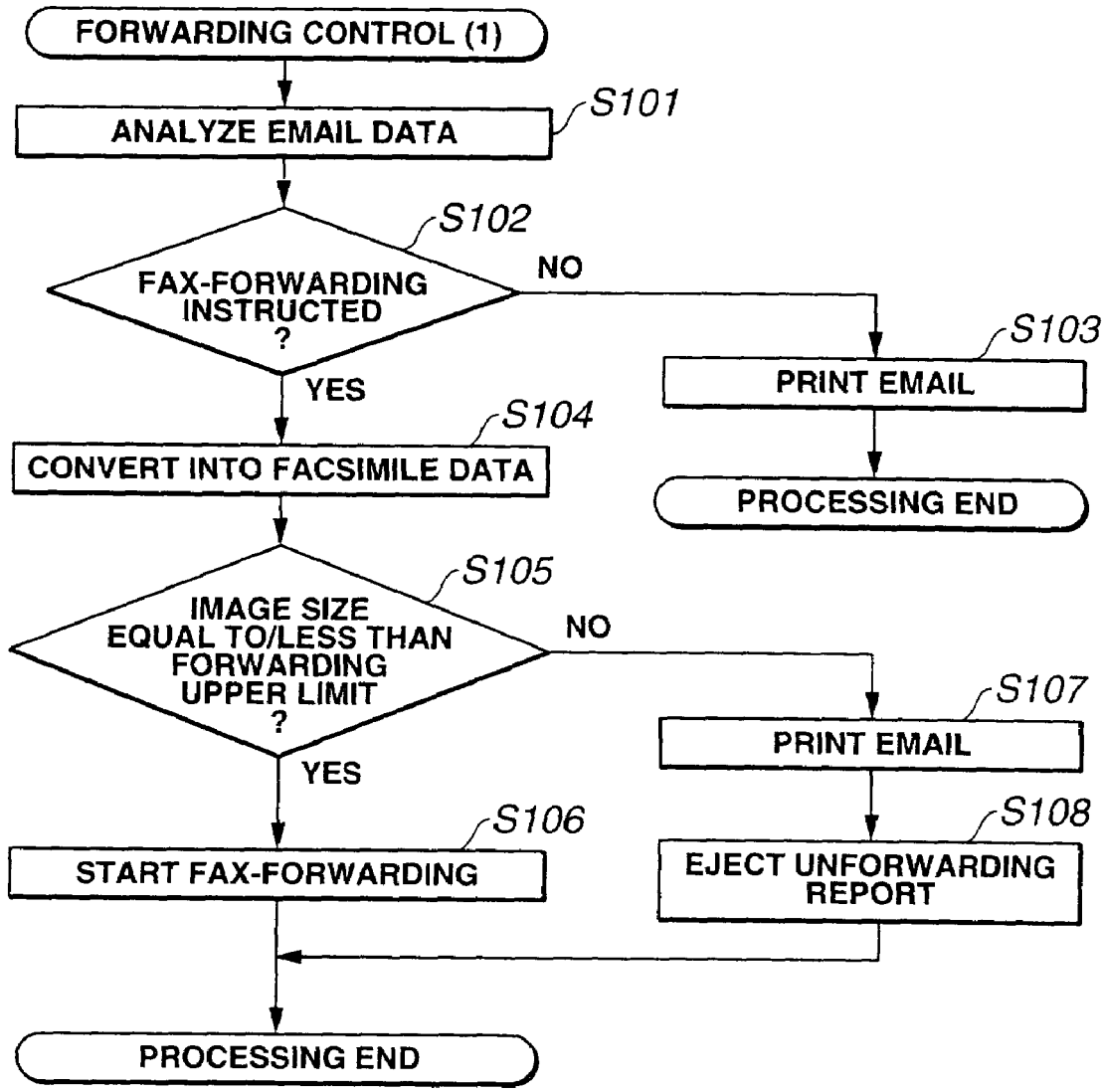
FIG. 2 is a flowchart illustrating processing steps of first forwarding control in the image communication apparatus according to the present invention.

FIG. 2 is a flowchart illustrating steps of the first forwarding control processing.

Referring to FIG. 2, in the first forward control processing, when an email is received, the email analyzing unit 7 analyzes the received email, and obtains information on the presence/absence of the forwarding instruction, the forwarding destination, and the sender from the received email (Step S101).

If the received email does not include the forwarding instruction (NO in Step S102), the image output unit 4 prints the received email (Step S103).

If the fax-forwarding is instructed (YES in Step S102), the email analyzing unit 7 converts the received email into the facsimile data (Step S104).

If the size of the converted facsimile data is equal to or less than the forwarding size upper limit 14 (YES in Step S105), the communication control unit 9 starts the fax-forwarding to the forwarding destination (S106).

If the size of the converted facsimile data exceeds the forwarding size upper limit 14 (NO in Step S105), the communication control unit 9 does not fax-forward, and the image output unit 4 prints the received email (S107), and prints a report reporting that the forwarding was not conducted (Step S108).

By conducting the first forwarding control processing described above, it is possible to prevent forwarding large-sized data to be forwarded, and to report that the forwarding was not conducted.

Consequently, it is possible to prevent the communication line from being occupied for a long period, and to restrain the increase of the cost.

Now, the second forwarding control processing is described.

In the second forwarding control processing in the image communication apparatus 1, when the fax-forwarding is conducted according to an instruction in a received email in the block diagram shown in FIG. 1, a page number of data to be forwarded is checked based on the forwarding page number upper limit 15 stored in the auxiliary memory unit 10, and if the page number exceeds the forwarding page number upper limit 15, the data to be forwarded is split into plural units each having page number of the forwarding page number upper limit 15 or less.

Figure 3:
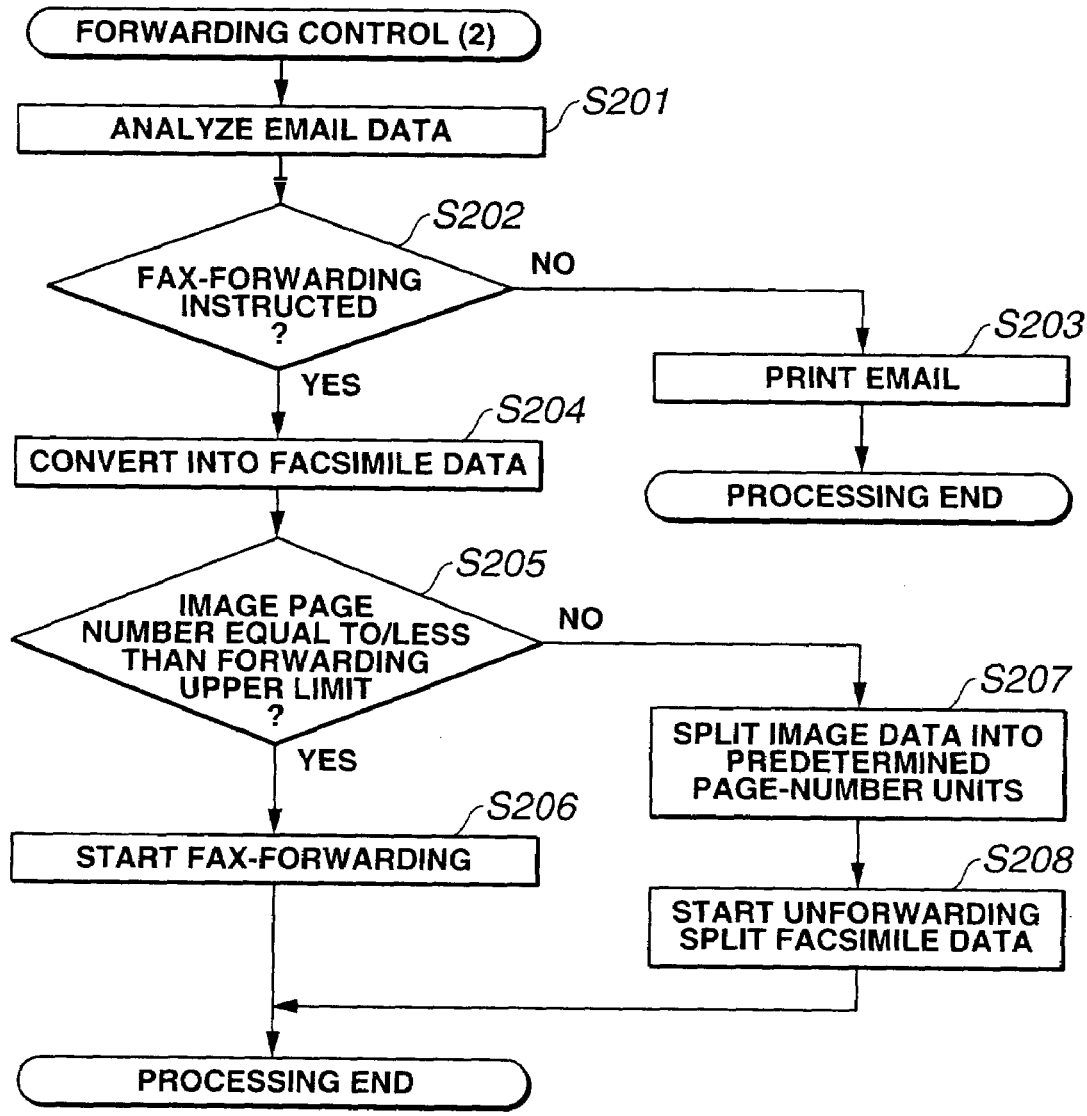
FIG. 3 is a flowchart illustrating processing steps of second forwarding control in the image communication apparatus according to the present invention.

FIG. 3 is a flowchart illustrating steps of the second forwarding control processing.

Referring to FIG. 3, when the email sending/receiving unit 8 receives an email, the email analyzing unit 7 analyzes a received email and obtains information on the presence/absence of a forwarding instruction, a forwarding destination, and a sender from the received email (Step S201).

If the fax-forwarding is not instructed (NO in Step S202), the image output unit 4 prints the email (Step S203).

If the fax-forwarding is instructed (YES in Step S202), the email analyzing unit 7 converts the received email into the facsimile data (Step S204).

If the page number of the converted facsimile data is equal to or less than the forwarding page number upper limit 15 (YES in Step S205), the communication control unit 9 starts the fax-forwarding to the forwarding destination (S206).

When the page number of the facsimile data exceeds the forwarding page number upper limit 15 (NO in Step S205), the communication control unit 9 splits the facsimile data so as not to exceed the forwarding page number upper limit (S207), and sends the split facsimile data to the forwarding destination separately (Step S208).

For example, when an email instructing the fax-forwarding is received while the forwarding page number upper limit 15 is set to 10 pages, the received email is converted into facsimile data. If the conversion into facsimile data results in 25 pages, which exceeds the forwarding page number upper limit of 10 pages, the facsimile data is split into plural units which page number does not exceeds the forwarding page number upper limit 15.

Thus, the individual facsimile data, which are split into units of 1-10 page, 11-20 page, and 21-25 page are fax-forwarded.

By conducting the second forwarding control processing described above, it is possible to fax-forward a large-sized data by splitting the date into plural units.

This splitting processing enables to insert sending and receiving of other data during this fax-forwarding of split units.

Now, the third forwarding control processing in the image communication apparatus is described.

In the third forwarding control processing in the image communication apparatus 1 in the block diagram shown in FIG. 1, an email received by the email sending/receiving control unit 8 is fax-forwarded according to the instruction in the forwarding list 11 stored in the auxiliary memory unit 10.

Specifically, when the email sending/receiving control unit 8 receives an email, the email analyzing unit 7 obtains information on the sender and the destination or the like required for the forwarding control from the received email.

The forwarding list 11 is a list for managing the destination address and the forwarding destination as a set.

When the destination address in the forwarding list 11 and the destination address of the received email obtained by the email analyzing unit 7 coincide with each other, it is considered that the fax-forwarding is instructed. Thus, the received email is converted into facsimile data, and the communication control unit 9 fax-forwards the facsimile data to the forwarding destination in the forwarding list 11.

FIG. 4A illustrates an example of items and contents of the forwarding list 11 and FIG. 4B illustrates an example of items and contents of the address book 12 stored and managed in the auxiliary memory unit 10.

As an example of determining whether an email is subject to the forwarding based on the forwarding list 11, the following description is given to a case where an email is determined as an email subject to the forwarding.

It is assumed that the image communication apparatus 1 having the forwarding list 11 and the address book 12 shown in FIGS. 4A and 4B receives an email whose destination address is "X@xxxxxx.co.jp" and whose sender's email address is "A@AAAA.co.jp".

In this case, since "X@xxxxxx.co.jp" is present in the forwarding list 11, forwarding to "03-XXXX" is instructed according to the forwarding list 11, and further, since the address "A@AAAA.co.jp" of the sender is present as an email address in the address book 12, the fax-forwarding is permitted, and the fax-forwarding is conducted.

Now, description is provided for a case where the forwarding is not instructed.

It is assumed that an email whose destination address is "Y@xxxxxx.co.jp" and whose sender' email address is "machigai@xxxxxx.co.jp" is received.

In this case, since "Y@xxxxxx.co.jp" is present in the forwarding list 11, forwarding to "03-YYY-YYYY" is instructed according to the forwarding list 11. However, since the address "machigai@xxxxxx.co.jp" of the sender is not present in the address book 12, the email is considered as an error email, and is not permitted to be fax-forwarded.

Note that in this embodiment, whether the fax-forwarding is permitted or not is determined based on the presence/absence of an email address in the address book 12. However, it is not limited to this forward determining method. Alternatively, for example, a forward determining method may also be adopted in which a permissible forwarding address list including a list of email addresses for which the forwarding is permitted is prepared, and whether the fax-forwarding is permitted or not is determined by directly comparing with this list.

Figure 5:
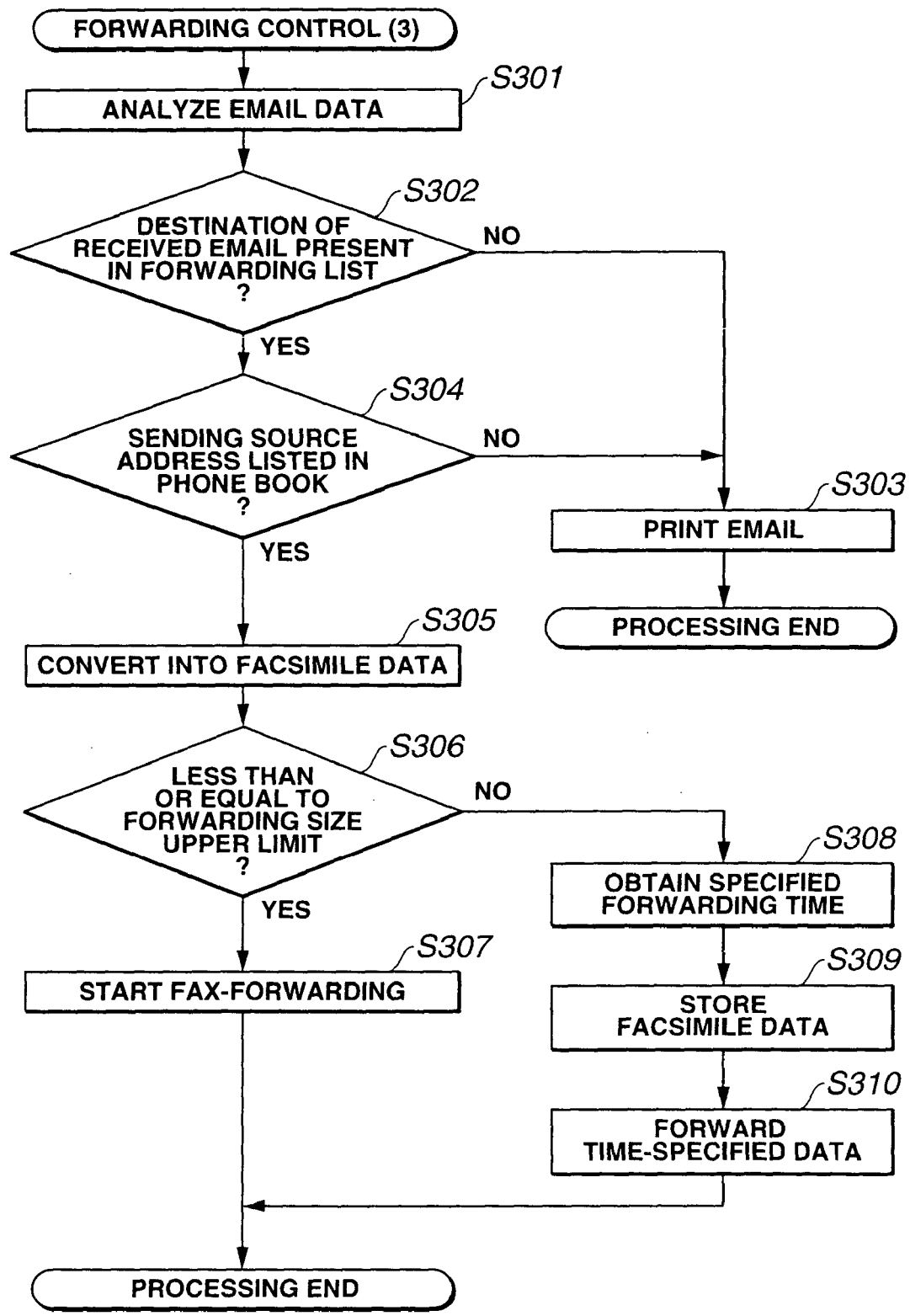
FIG. 5 is a flowchart illustrating processing steps of third forwarding control in the image communication apparatus according to the present invention.

FIG. 5 is a flowchart illustrating steps of the third forwarding control processing in the image communication apparatus 1 according to an embodiment of the present invention.

Referring to FIG. 5, the email analyzing unit 7 analyzes a received email, and obtains information on the presence/absence of a forwarding instruction, a forwarding destination and a sender's address from the received email (Step S301).

If the destination address is not present in the forwarding list 11 (NO in Step S302), the image output unit 4 prints the received email (Step S303).

If the destination address is present in the forwarding list 11 (YES in Step S302), the email analyzing unit 7 considers that the fax-forwarding is instructed, and obtains a forwarding destination from the forwarding list 11.

When the sender's address obtained in Step S302 is not registered to the address book 12 (NO in Step S304), the forwarding is not permitted, and the image output unit 4 prints the received email (Step S303).

When the sender's address is registered to the address book 12 (YES in Step S304), the email analyzing unit 7 permits the fax-forwarding, and the email analyzing unit 7 converts the received email into facsimile data (Step S305).

If the size of the converted facsimile data is equal to or less than the forwarding size upper limit 14 (YES for Step S306), the communication control unit 9 starts the fax-forwarding (S307).

If the converted facsimile data size exceeds the forwarding size upper limit 14 (NO in Step S306), the communication control unit 9 obtains the forwarding time 13 (Step S308), stores the forwarding information 16 which associates the facsimile data with the forwarding time 13 in the auxiliary memory unit 10 (Step S309), and conducts time-specified fax-forwarding (Step S310)

By conducting the third forwarding control processing described above, forwarding is determined based on the sender's email address of the received email.

As a result, it is possible to prevent misuse by a third party as well as to prevent wasteful spending of communication cost by avoiding the fax-forwarding of useless emails not only when the sender of an email intends fax-forwarding but also when a receiver side of an email sets the fax-forwarding.

Additionally, it is possible to process the fax-forwarding of the received email in a time zone where other facsimile sending/receiving is not interrupted or in a time zone where the communication rate is relatively low.

Now, the fourth forwarding control processing is described.

In the fourth forwarding control in the image communication apparatus 1, the fax-forwarding is controlled by considering both a forwarding instruction in a received email, and a forwarding instruction in the forwarding list 11 in the image communication apparatus 1.

When the email sending/receiving unit 8 receives an email, the email analyzing unit 7 analyzes email data to obtain information such as the presence/absence of a forwarding instruction, a forwarding destination, a sender, a destination address, and the like.

The forwarding list 11 is stored in the auxiliary memory unit 10, and it is considered that the fax-forwarding is instructed only when the destination of the received email and a destination address in the forwarding list 11 match with each other.

When the forwarding instruction is present, the email is fax-forwarded to the forwarding destination.

The email analyzing unit 7 stores the forwarding information 16 including the presence/absence of the forwarding instruction, the forwarding destination, the forwarding instruction source, and document information in the auxiliary memory unit 10.

The auxiliary memory unit 10 also stores the forwarding size upper limit 14.

Further, the auxiliary memory unit 10 temporarily stores contents of the forwarding instruction in the received email and contents of the forwarding instruction in the forwarding list 11 on the image communication apparatus 1 side to control for final determination of the fax-forwarding.

Figure 6:
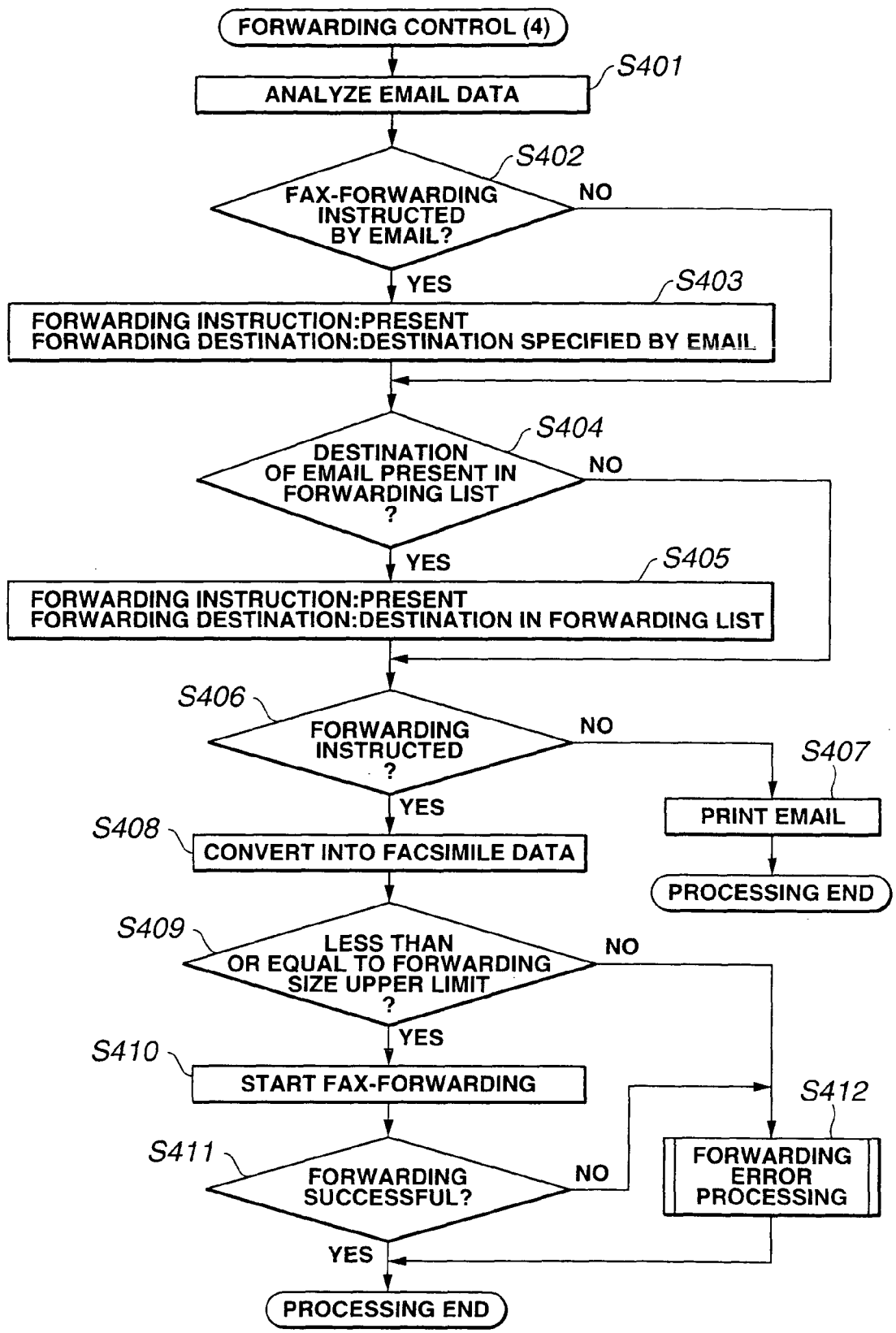
FIG. 6 is a flowchart illustrating processing steps of fourth forwarding control in the image communication apparatus according to the present invention.

FIG. 6 is a flowchart illustrating steps of the fourth forwarding control processing in the image communication apparatus 1.

When the email sending/receiving control unit 8 receives an email, the email analyzing unit 7 analyzes the email data, and obtains the presence/absence of the forwarding instruction, the forwarding destination, and the sender's address (Step S401).

If the fax-forwarding is instructed by the email (YES in Step S402), the forwarding information 16 in which "Present" is set to the presence/absence of the forwarding instruction, the destination address is set to the forwarding destination and "Mail" is set to the forwarding instruction source is associated with the received email (Step S403).

If the destination in the forwarding information 16 set in Step S403 is present in the forwarding list 11 (YES in Step S404), the email analyzing unit 7 associates the forwarding information 16 in which "Present" is set to the presence/absence of the forwarding instruction, the forwarding destination in the forwarding list 11 is set to the forwarding destination, and "Forwarding list" is set as the forwarding instruction source with the received email document (Step S405).

If the forwarding instruction is not present both in the received email and in the forwarding list 11 (NO in Step S406), the image output unit 4 prints the received email document (Step S407).

When the forwarding instruction is present (YES for Step S406), the email analyzing unit 7 converts the received email into facsimile data (Step S408).

At this point, if the forwarding instruction is present both in the received email and in the forwarding list 11, the contents of the forwarding instruction of the received email are adopted as having priority, and the forwarding instruction in the forwarding list 11 is neglected.

If the size of the facsimile data converted by the communication control unit 9 exceeds the forwarding size upper limit 14 (NO in Step S409), forwarding error processing is conducted (Step S412).

If the size of the converted facsimile data is equal to or less than the forwarding size upper limit 14 (YES for Step S409), the communication control unit 9 starts the fax-forwarding (Step S410).

If the fax-forwarding fails (NO in Step S411), the communication control unit 9 conducts forwarding error processing (Step S412).

As described above, by performing the fourth forwarding control of the image communication apparatus 1, the fax-forwarding can be conducted while the intention of the email sender is given priority. As a result, it is possible to prevent misforwarding to an unintended destination by the email sender.

Now, the forwarding error processing (in Step S412) in the flowchart in FIG. 6 described above is further described in detail.

Figure 7:
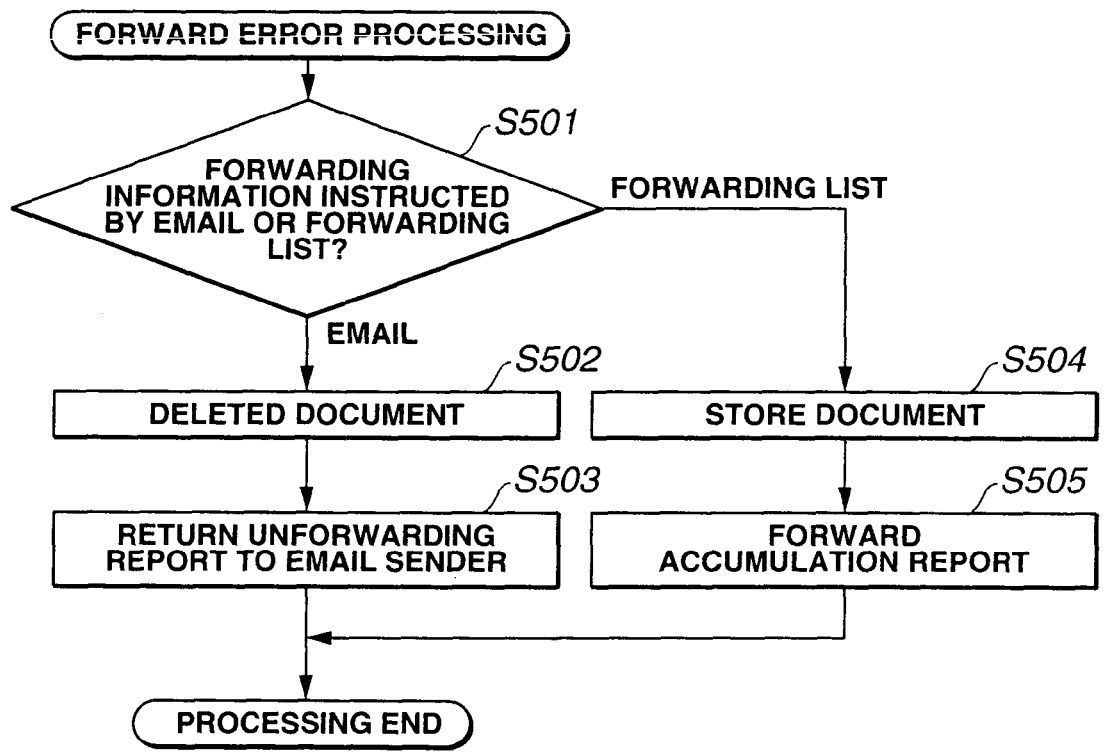
FIG. 7 is a flowchart illustrating steps of forwarding error processing in the image communication apparatus according to the present invention.

FIG. 7 is a flowchart illustrating steps of the forwarding error processing in the image communication apparatus 1.

When the forwarding error processing starts, the forwarding information 16 associated with the received email is referred.

If the forwarding instruction source in the forwarding information 16 is "Forwarding list" (Forwarding list in Step S501), the forwarding instruction is intended by a managing person of the image communication apparatus 1. Therefore, the received email and the forwarding information 16 are stored in the auxiliary memory unit 10 (Step S504), the communication control unit 9 sends by facsimile an accumulation report indicating that the received email document is accumulated to the forwarding destination (Step S505).

If the forwarding instruction source in the forwarding information 16 is "Email" (Mail in Step S501), the forwarding instruction is intended by the email sender. Therefore, the received email is deleted (Step S502), the email sending/receiving control unit 8 creates a report email reporting that the forwarding failed, and sends the report by email to the email sender (Step S503).

By conducting the forwarding error processing described above, it is possible to properly send a report to a party intending the fax-forwarding when the facsimile was not forwarded as a result of the determination on the forwarding or a communication error.

Further, it is possible to prevent the received email from being retained by the forwarding party (image communication apparatus 1) against the intention of the email sender while necessary emails are stored.

The forwarding control proceeding s in the image communication apparatus has been described above.

Now, modifications of the first through fourth forwarding control proceedings are described.

In the embodiment described above, the system data such as the forwarding size upper limit 14 and the forwarding page number upper limit 15 are stored in the auxiliary memory unit 10. Alternatively, such a constitution may be adopted in which operations are performed while the system data are stored in the main memory unit 6.

Further, in the embodiment described above, a comparison to the forwarding size upper limit 14 or the forwarding upper limit page size 15 is made while the subject to the comparison is the facsimile data converted from the received email document. However, the subject to the comparison is not limited to the converted facsimile data, and the comparison may be performed to the page number in the document data of the received email.

Furthermore, such a constitution that user interface is added where an operator of the image communication apparatus 1 can use the operation display unit 2 to change the individual system data including the forwarding size upper limit 14 and the forwarding time 13 is added, and the operator properly changes the system data for the forwarding control is possible.

What is claimed is:

1. An image communication apparatus, comprising:
an email receiving unit that receives an email;
a determining unit that analyzes the email received by the email receiving unit, and determines whether the email includes facsimile-forwarding instructing information which indicates a facsimile-forwarding destination;
a converting unit that converts the email received by the email receiving unit into facsimile data, the facsimile data including facsimile image data to be transferred to a facsimile machine of the facsimile-forwarding destination indicated by the facsimile-forwarding instructing information, if the determining unit determines that the email received by the email receiving unit includes the facsimile-forwarding instructing information;
a setting unit that sets a forwarding size upper limit of the facsimile data when the email received by the email receiving unit is facsimile-forward in the form of the facsimile data;
a facsimile forwarding control unit that facsimile-forwards the facsimile data converted by the converting unit to the facsimile-forwarding destination indicated by the facsimile-forwarding instructing information when the facsimile data converted by the converting unit does not exceed the forwarding size upper limit set by the setting unit;
a splitting unit that splits the facsimile data converted by the converting unit into a plurality of split facsimile data when the facsimile data converted by the converting unit exceeds the forwarding size upper limit; and
a split forwarding unit that forwards the plurality of the split facsimile data split by the splitting unit to the facsimile machine of the facsimile-forwarding destination indicated by the facsimile-forwarding instructing information separately, wherein
the split forwarding unit receives other data during splitting and forwarding the facsimile data.

2. The image communication apparatus according to claim 1, wherein the setting unit sets the forwarding size upper limit in correspondence with a data size of the facsimile data converted by the converting unit.

3. The image communication apparatus according to claim 1, wherein the setting unit sets the forwarding size upper limit in correspondence with number of pages of the facsimile data converted by the converting unit.

4. An image communication apparatus, comprising:
an email receiving unit that receives an email;
a registering unit that registers a facsimile-forwarding destination to which the email is permitted to be facsimile-forwarded corresponding to a sender of the email;
a determining unit that analyzes the email received by the email receiving unit, and determines whether a facsimile-forwarding destination to which the email is permitted to be facsimile-forwarded corresponding to the sender of the email is registered by the registering unit;
a converting unit that converts the email received by the email receiving unit into facsimile data, the facsimile data including facsimile image data to be transferred to a facsimile machine of the facsimile-forwarding destination, if the determining unit determines that the facsimile-forwarding destination to which the email is permitted to be facsimile-forwarded corresponding to the sender of the email is registered by the registering unit;

a setting unit that sets a forwarding size upper limit of the facsimile data when the email received by the email receiving unit is facsimile-forwarded in the form of the facsimile data;

a facsimile forwarding control unit that facsimile-forwards the facsimile data converted by the converting unit to the facsimile machine of the facsimile-forwarding destination when the facsimile data converted by the converting unit does not exceed the forwarding size upper limit set by the setting unit;

a splitting unit that splits the facsimile data converted by the converting unit into a plurality of split facsimile data when the facsimile data converted by the converting unit exceeds the forwarding size upper limit; and a split forwarding unit that forwards the plurality of the split facsimile data split by the splitting unit to the facsimile machine of the facsimile-forwarding destination registered by the registering unit separately, wherein the split forwarding unit receives other data during splitting and forwarding the facsimile data.

5. The image communication apparatus according to claim 4, wherein the setting unit sets the forwarding size upper limit in correspondence with a data size of the facsimile data converted by the converting unit.

6. The image communication apparatus according to the claim 4, wherein the setting unit sets the forwarding size upper limit in correspondence with number of pages of the facsimile data converted by the converting unit.

7. An image communication apparatus, comprising:

an email receiving unit that receives an email;

a registering unit that registers a facsimile-forwarding destination to which the email is permitted to be facsimile-forwarded corresponding to a sender of an email;

a first determining unit that analyzes the email received by the email receiving unit, and determines whether the email includes facsimile-forwarding instructing information which indicates a facsimile-forwarding destination;

a second determining unit that analyzes the email received by the email receiving unit, and determines whether a facsimile-forwarding destination to which the email is permitted to be facsimile-forwarded corresponding to the sender of the email is registered by the registering unit;

a converting unit that converts the email received by the receiving unit into facsimile data, the facsimile data including facsimile image data to be transferred to a facsimile machine of the facsimile-forwarding destination if the first determining unit determines that the email received by the email receiving unit includes the facsimile-forwarding instructing information, and converts the email received by the email receiving unit into facsimile data, the facsimile data including facsimile image data to be transferred to a facsimile machine of the facsimile-forwarding destination if the second determining unit determines that the facsimile-forwarding destination to which the email is permitted to be facsimile-forwarded corresponding to the sender of the email is registered by the registering unit;

a selection unit that selects a facsimile-forwarding destination indicated by the facsimile-forwarding instructing information if the first determining unit determines that the email received by the email receiving unit includes the facsimile-forwarding instructing information, or selects a facsimile-forwarding destination registered by the registering unit if the first determining unit determines that the email received by the email receiving unit does not include the facsimile-forwarding instructing information and the second determining unit determines that the facsimile-forwarding destination to which the email is permitted to be facsimile-forwarded corresponding to the sender of the email is registered by the registering unit;

a setting unit that sets a forwarding size upper limit of the facsimile data when the email received by the email receiving unit is facsimile-forwarded in the form of the facsimile data; and a facsimile forwarding control unit that facsimile-forwards the facsimile data converted by the converting unit to the facsimile machine of the facsimile-forwarding destination selected by the selection unit when the facsimile data converted by the converting unit does not exceed the forwarding size upper limit set by the setting unit.

8. The image communication apparatus according to claim 7, further comprising:

a third determining unit that determines whether the facsimile-forwarding conducted by the facsimile forwarding control unit has been completed;

a fourth determining unit that determines whether the facsimile-forwarding destination selected by the selection unit is a facsimile-forwarding destination instructed by the facsimile-forwarding instructing information or a facsimile-forwarding destination registered by the registering unit; and a reporting unit that deletes the facsimile data converted by the converting unit and sends a report of facsimile-forwarding failure by an email to the sender of the email if the third determining unit determines that the facsimile-forwarding has been failed and the fourth determining unit determines that the facsimile-forwarding destination selected by the selection unit is the facsimile-forwarding destination indicated by the facsimile-forwarding instructing information, or stores the facsimile data converted by the converting unit and sends an accumulation report by an email to the sender of the email if the third determining unit determines that the facsimile-forwarding has been failed and the fourth determining unit determines that the facsimile-forwarding destination selected by the selection unit is the facsimile-forwarding destination registered by the registering unit.

* * * * *